(12) United States Patent
Nah

(10) Patent No.: US 9,280,221 B2
(45) Date of Patent: Mar. 8, 2016

(54) CAPACITANCE TOUCH PANEL

(75) Inventor: Hyunmin Nah, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 239 days.

(21) Appl. No.: 12/957,830

(22) Filed: Dec. 1, 2010

(65) Prior Publication Data
US 2011/0128252 A1  Jun. 2, 2011

(30) Foreign Application Priority Data

Dec. 1, 2009 (KR) .................... 10-2009-0118068

(51) Int. Cl.
*G06F 3/044* (2006.01)
*G06F 3/041* (2006.01)

(52) U.S. Cl.
CPC ............... *G06F 3/041* (2013.01); *G06F 3/044* (2013.01)

(58) Field of Classification Search
CPC .......... G02F 1/133502; G02F 1/13338; G06F 3/041; G06F 3/044
USPC ................................. 345/173, 174; 178/18.06
See application file for complete search history.

(56) References Cited

U.S. PATENT DOCUMENTS

| | | | | |
|---|---|---|---|---|
| 6,572,975 | B2 * | 6/2003 | Dalakos | 428/451 |
| 6,727,566 | B1 * | 4/2004 | Fukui et al. | 257/437 |
| 2004/0027339 | A1 * | 2/2004 | Schulz | 345/173 |
| 2005/0083307 | A1 * | 4/2005 | Aufderheide et al. | 345/173 |
| 2009/0046072 | A1 * | 2/2009 | Emig et al. | 345/173 |
| 2009/0153511 | A1 * | 6/2009 | Jiang et al. | 345/173 |
| 2009/0160819 | A1 * | 6/2009 | Sasaki et al. | 345/174 |
| 2009/0219259 | A1 * | 9/2009 | Kwon | 345/173 |

FOREIGN PATENT DOCUMENTS

| | | |
|---|---|---|
| KR | 10-2008-0010384 A | 1/2008 |
| TW | 200620078 A | 6/2006 |

OTHER PUBLICATIONS

Office Action dated May 29, 2013 in Taiwanese Application No. 099141480, filed Nov. 30, 2010.
Office Action dated Jun. 28, 2011 in Korean Application No. 10-2009-0118068, filed Dec. 1, 2009.

* cited by examiner

*Primary Examiner* — Lun-Yi Lao
*Assistant Examiner* — Ibrahim Khan
(74) *Attorney, Agent, or Firm* — Saliwanchik, Lloyd & Eisenschenk

(57) ABSTRACT

Disclosed is a capacitance touch panel, including a substrate, a transparent electrode formed at a partial area of a substrate, and an optical layer formed on the substrate formed with the transparent electrode in an overspreading (blanketing) way, whereby the optical layers are formed on a transparent electrode, each having a different refractive index to reduce a reflexibility of the transparent electrode and a reflexibility of a substrate, thereby improving a transparent electrode-visible phenomenon.

4 Claims, 2 Drawing Sheets

CAPACITANCE TOUCH PANEL

CROSS-REFERENCE TO RELATED APPLICATION

This application claims the benefit under 35 U.S.C. §119 of Korean Patent Application No. 10-2009-0118068, filed on Dec. 1, 2009, which is hereby incorporated by reference in its entirety.

BACKGROUND OF THE DISCLOSURE

1. Field of the Invention

The present disclosure relates to a capacitance touch panel, and more particularly to a capacitance touch panel configured to form optical layers on a transparent electrode, each having a different refractive index to reduce a reflexibility of the transparent electrode and a reflexibility of a substrate, thereby improving a transparent electrode-visible phenomenon.

2. Discussion of the Related Art

A touch screen may be largely classified into a resistance film method, a capacitance method, a projection type capacitance method, an induction method and a surface acoustic wave (SAW) method, based on an operating method of a touch screen. The resistance film method uses an analog resistance film method as the detection principle of X-Y coordinate, and uses a general detection method for detecting the coordinate of an input point. The resistance film touch panel is advantageous due to being low in cost and size, but disadvantageous in that a surface damage appears in a long time of use due to physical contact.

In contrast, the capacitance touch screen method is a technology in which a switching signal is generated as a result of detection where contact or approach of a conductive body to a single electrode plate is detected using changed capacitance, such that the capacitance touch screen has been frequently developed recently as a complement to overcome the disadvantages of the conventional resistive film method.

That is, the capacitance touch panel detects an electric charge developed between a transparent conductive film and a stylus which makes contact with the transparent conductive film. The capacitance touch panel calculates a coordinate value based on a value of the electric charge developed between the transparent conductive film and the stylus. To develop the electric charge, however, the stylus of the capacitance touch panel requires a separate power source and, as a result, the resistance film touch panel is typically used as an input device instead of the capacitance touch panel.

However, the capacitance touch panel also suffers from a disadvantage in that reflexibility (between an area where the transparent electrode pattern is formed and an area where the transparent electrode pattern is not formed) is different to generate a so-called 'ITO (indium tin oxide) pattern-visible (or viewing) phenomenon', whereby an exterior of the touch panel looks bad.

BRIEF SUMMARY

The present disclosure has been made in view of the foregoing disadvantages, and it is a first object of the present disclosure to provide a capacitance touch panel configured to form optical layers on a transparent electrode, each having a different refractive index to reduce a reflexibility of the transparent electrode and a reflexibility of a substrate, thereby improving a transparent electrode-visible phenomenon.

In one general aspect of the present disclosure, there is provided a capacitance touch panel, the panel comprising: a substrate; a transparent electrode formed at a partial area of a substrate; and an optical layer formed on the substrate formed with the transparent electrode in an overspreading (blanketing) way, where the optical layer is formed with a refractive index different from that of the transparent electrode.

In some exemplary embodiments of the present disclosure, the capacitance touch panel may further include an undercoating layer between the substrate and the transparent electrode, the layer having a refractive index higher than that of the substrate but smaller than that of the transparent electrode.

In some exemplary embodiments of the present disclosure, the optical layer may be selected from any one or more from a group consisting of aluminum oxide, $SiO_2$, zinc oxide, or a mixture thereof.

In another general aspect of the present disclosure, there is provided a capacitance touch panel, the panel comprising: a substrate; a transparent electrode formed at a partial area of a substrate; and an optical layer formed between the substrate and the transparent electrode, the layer having a refractive index different from that of the substrate.

In some exemplary embodiments of the present disclosure, the optical layer may be selected from any one or more from a group consisting of aluminum oxide, $SiO_2$, zinc oxide, or a mixture thereof.

The capacitance touch panel thus configured can improve the transparent electrode visible phenomenon to reduce defects and to have a beautiful exterior look.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Figure 1:
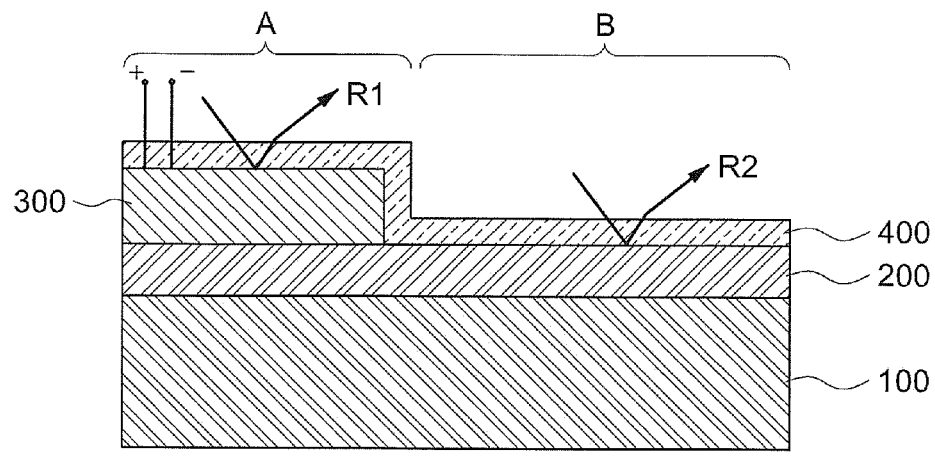
FIG. 1 is a cross-sectional view illustrating a touch panel according to a first exemplary embodiment of the present disclosure.

The disclosure can be variously modified in various embodiments and specific embodiments will be described and shown in the drawings. It should be understood that the disclosure is not limited to the embodiments but includes all modifications, equivalents, and replacements belonging to the technical spirit and scope of the invention.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present disclosure.

If it is mentioned that an element is "connected to" or "coupled to" another element, it should be understood that the element may be connected or coupled directly to another element or that still another element may be interposed therebetween. On the contrary, if it is mentioned that an element is "connected directly to" or "coupled directly to" another element, it should be understood that still another element is not interposed therebetween.

The terminology used herein is for the purpose of describing particular embodiments only and is not intended to be limiting of the invention. As used herein, the singular forms "a", "an" and "the" are intended to include the plural forms as well, unless the context clearly indicates otherwise. In the drawings, sizes or shapes of constituent elements may be exaggerated or reduced for clarity and convenience. Like reference numerals refer to like elements throughout.

Figure 2:
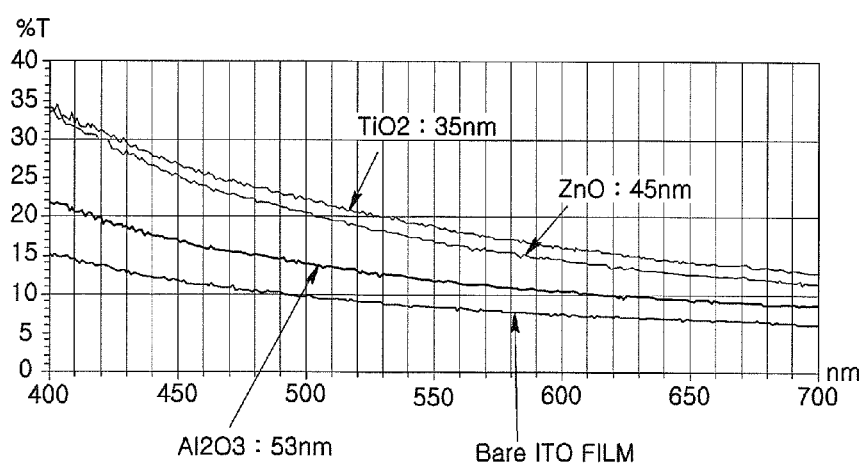
FIG. 2 is a graph illustrating a difference of reflectivity based on material of an optical layer according to an exemplary embodiment of the present disclosure.
Figure 3:
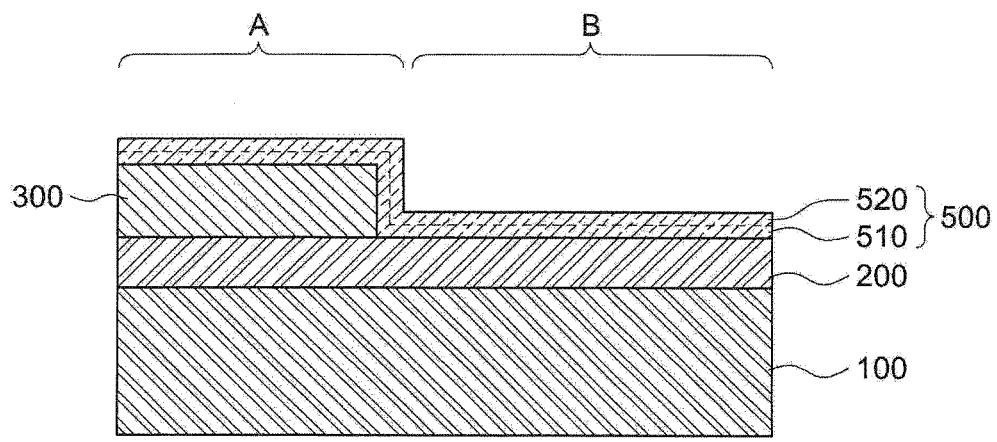
FIG. 3 is a cross-sectional view illustrating a touch panel formed with an optical layer in a stacked-up pattern according to an exemplary embodiment of the present disclosure.

FIG. 1 is a cross-sectional view illustrating a touch panel according to a first exemplary embodiment of the present disclosure, FIG. 2 is a graph illustrating a difference of reflectivity based on material of an optical layer according to an exemplary embodiment of the present disclosure, and FIG. 3 is a cross-sectional view illustrating a touch panel formed with an optical layer in a stacked-up pattern according to an exemplary embodiment of the present disclosure.

A capacitance touch panel according to the present disclosure comprises: a substrate 100; a transparent electrode 300 formed at a partial area of a substrate 100; and an optical layer 400 formed on the substrate formed with the transparent electrode and formed on the remaining area.

The substrate 100 may include glass and other various plastic materials including but not limited to PET, acrylic, polycarbonate, and transparent conductive oxides such as doped tin oxides. The substrate 100 may have a thickness of 20~500 μm and may be attached by a support body for securing a stiffness. The substrate 100 may be formed thereon with an under-coating layer 200 which may include such materials as $SiO_2$, $TiO_2$ and stannic oxide.

The transparent electrode 300 formed on the substrate 100 may include ITO (Indium Tin Oxide), TAO (Tin Antimony Oxide) and transparent conductive oxides such as doped tin oxides, which may be evaporated on the substrate 100 using PVD engineering methods such as sputtering, resistance evaporation, electronic beam evaporation and ion plating method, or CVC engineering method, and printing method.

Although not shown in the drawings, an upper margin of the transparent electrode 300 may be formed with a wiring pattern (not shown) comprised of conductive metal. The wiring pattern may be arranged at the marginal area of the transparent electrode 300 to provide a voltage to the transparent electrode 300. The wiring pattern may use a conductive material such as Ag paste, for example. The wiring pattern may be connected to a driving integrated circuit chip (not shown) to receive a power.

The transparent electrode 300 may take a predetermined pattern of a lozenge or a rectangle, for example, on the substrate 100. However, the pattern is not limited thereto and may take other arbitrary shapes. For example, the transparent electrode may be coated on the substrate 100 with a predetermined thickness and removed from the substrate 100 according to the pattern. In order to remove the parts, various techniques including photolithography, laser ablation, etching and patterned lift-off may be utilized.

Therefore, the substrate 100 is formed with an area coated by the transparent electrode 300 and an exposed area from which the substrate is exposed, and for convenience sake, the area coated by the transparent electrode 300 is defined as a 'first area (A)', and the exposed area is defined as a 'second area (B)'.

The first and second areas (A, B) may generate a difference of reflectivity in which visible light is reflected, based on difference of refractive index of transparent electrode 300 and the substrate 100 or that of the under-coating layer 200.

The optical layer 400 is formed to overcome the difference of reflectivity. The optical layer 400 may select one or more materials from a group consisting of a mixture of aluminum oxide, silicon oxide, zinc oxide or tin oxide-oxide hafnium series, silicon oxide-silicon oxide series, zinc oxide-titan oxide series.

To be more specific, the optical layer 400 is evaporated on the first area (A) and the second area (B) in an equal thickness, where the evaporation method includes all the general evaporation methods. For example, the optical layer 400 may be formed by evaporation methods such as sputtering, resistance evaporation and electronic beam evaporation methods.

The optical layer may be formed with a different thickness based on used materials. Referring to FIG. 2, it can be noted that difference of reflectivity becomes smallest in case of aluminum oxide in which the refractive index is 1.63 and evaporation thickness is approximately 40~60 nm where difference of transmittance with bare ITO is less conspicuous.

It can be noted that the difference of transmittance with bare ITO is reduced in case of zinc oxide where the refractive index is 2.025 and evaporation thickness is approximately 40~50 nm. Furthermore, in case of thickness of the transparent electrode 300 being less than 25 nm, an absolute value of reflectivity difference of light reflected from the first and second areas (A, B) may be reduced to less than 0.5, even if the thickness of zinc oxide is less than 40 nm.

In case of titan oxide, if evaporation is implemented with a thickness of 10~30 nm which is thinner than that of the aluminum oxide or zinc oxide, it is noted that the bare ITO and the transmittance difference can be reduced. Furthermore, in a case the optical layer 400 is formed on the first and second areas (A, B), wavelength of outside light reflected from the first area (A) and wavelength of the outside light reflected from the second area (B) become mutually interference-offsetting wavelength, whereby the patterns of the transparent electrode 300 are not easily visible from outside to advantageously improve the visibility.

Referring to FIG. 3, an optical layer 500 may be formed with a low refractive index layer 510 and a high refractive index layer 520 having a relatively higher refractive index than that of the low refractive index layer 510 in a stacked-up style. At this time, the high refractive index layer 520 may include silicon stone oxide film and evaporated with a thickness of 10~50 nm, while the low refractive index layer 510 may include an oxide silicon film and evaporated with a thickness of 50~100 nm.

The structure thus configured can create an effect of restricting the reflection as much as half that of the visible light incident on the interior of the touch panel while passing the multilayered films, each having a different refraction index.

Figure 4:
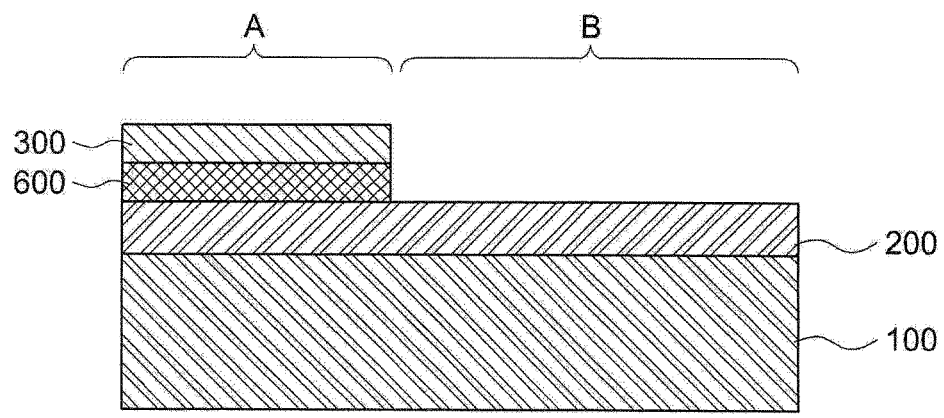
FIG. 4 is a cross-sectional view illustrating a capacitance touch panel according to another exemplary embodiment of the present disclosure.

FIG. 4 is a cross-sectional view illustrating a capacitance touch panel according to another exemplary embodiment of the present disclosure.

The capacitance touch panel according to the another exemplary embodiment of the present disclosure may include a substrate 100; a transparent electrode 300 formed at a partial area of a substrate; and an optical layer 600 formed between the substrate 100 and the transparent electrode 300, the layer having a refractive index different from that of the substrate 100.

The optical layer 600 is evaporated on the first area (A) with an even thickness, where the evaporation methods may include all the general evaporation methods including but not limited to sputtering method, resistance evaporation and electronic beam evaporation method. The optical layer 600 is formed between the transparent electrode 300 and the substrate 100, where the optical layer 600 may be initially coated, to which the transparent electrode 300 is coated and etched to form a predetermined pattern.

However, the configuration thus mentioned is not limited thereto. For example, the optical layer 600 may be formed on an upper surface of the transparent electrode 300. Based on these configurations, thickness of the transparent electrode 300 and the optical layer 600 of the first area (A) can provide a reflection prevention characteristic, whereby the reflections of visible light from the first area (A) and the second area (B) become equal.

Furthermore, the optical layer 600 coated on the first area (A) uses the optical interference to allow phases of surface reflection light from the optical layer 600 and of surfactant reflection light to be reversed, whereby the overlapped wavelengths are interference-offset to reduce the reflection light. At this time, the following equations must be satisfied.

$$(n_1)^2 = n_o * n_2 \quad \text{[Formula 1]}$$

$$n_1 * d_1 = \lambda/4 \quad \text{[Formula 2]}$$

wherein, n is a film refraction index, $d_1$ is a film thickness and $n_2$ is refraction index of the substrate(100).

If the above conditions are met, the wavelength of light reflected from the optical layer 600 and the wavelength of light reflected from the transparent electrode 300 generate a λ/4 phase difference, whereby interference is generated to make the reflection zero percent. Therefore, the thickness of the optical layer 600 may be adjusted to meet the conditions of Formula 1 and 2, whereby the patterns of the transparent electrode 300 can be invisible from outside.

Although the present disclosure has been described in terms of exemplary embodiments, the embodiments disclosed in this application are to be considered in all respects as illustrative and not limiting. It should be appreciated that all modifications or changes that come within the meaning and range of equivalency of the claims may be made in the embodiments described by persons skilled in the art without departing from the scope of the present disclosure as defined by the following claims.

What is claimed is:

1. A capacitance touch panel, comprising:
   a substrate;
   a transparent electrode covering a partial area of the substrate;
   an optical layer on the substrate and the transparent electrode, wherein a refractive index of the optical layer is different from that of the transparent electrode; and
   an under-coating layer between the substrate and the transparent electrode, the under-coating layer having a refractive index greater than that of the substrate but smaller than that of the transparent electrode;
   wherein the optical layer is formed with a uniform thickness on both a first area of the substrate where the transparent electrode is formed and a second area of the substrate where the transparent electrode is not formed,
   wherein the thickness of the optical layer is configured such that a first wavelength of first light reflected from the first area and a second wavelength of second light reflected from the second area are interference-offset to reduce reflection of both lights.
   wherein the optical layer directly contacts both a top surface and a lateral surface of the transparent electrode, and wherein the under-coating layer is formed of a material different from that of the optical layer.

2. The panel of claim 1, wherein the optical layer is formed of one or more selected from a group consisting of aluminum oxide, $SiO_2$, zinc oxide, and a mixture thereof.

3. A capacitive touch panel, the panel comprising:
   a substrate;
   a transparent electrode covering a portion of the substrate; and
   an optical layer on both the substrate and the transparent electrode, the optical layer being a single layer, the optical layer having a refractive index different from that of the transparent electrode, the optical layer having a substantially uniform thickness on both a first area of the substrate on which the transparent electrode is formed and a second area of the substrate on which the transparent electrode is not formed, and the optical layer comprising any one of aluminum oxide, zinc oxide, and titan oxide;
   wherein the thickness of the optical layer is configured such that a first wavelength of first light reflected from the first area and a second wavelength of second light reflected from the second area are interference-offset to reduce reflection of both lights, and
   wherein:
   the thickness of the optical layer is in a range of 40 to 60 nm when the optical layer includes aluminum oxide;
   the thickness of the optical layer is in a range of 40 to 50 nm when the optical layer includes zinc oxide; or
   the thickness of the optical layer is in a range of 10 to 30 nm when the optical layer includes titan oxide.

4. The panel of claim 3, wherein the optical layer has a substantially uniform thickness on a lateral surface of the transparent electrode and a top surface of the transparent electrode.

* * * * *